United States Patent [19]

Weber

[11] 4,095,167

[45] June 13, 1978

[54] CONCEALED STRUCTURE LOCATING AND SURVEYING EXCITER

[76] Inventor: Harold James Weber, 20 Whitney Dr., Sherborn, Mass. 01770

[21] Appl. No.: 694,386

[22] Filed: Jun. 9, 1976

Related U.S. Application Data

[62] Division of Ser. No. 643,606, Dec. 22, 1975, Pat. No. 4,044,299.

[51] Int. Cl.$^2$ .................. G01V 3/10; G01D 21/04; G01V 3/08
[52] U.S. Cl. ........................................... 324/3; 324/5; 324/67
[58] Field of Search .................. 324/3, 52, 67, 5, 6; 307/268; 328/127, 30; 330/15; 331/75, 113.1, 114, 158; 340/258 C, 258 D

[56] References Cited

U.S. PATENT DOCUMENTS

| | | | |
|---|---|---|---|
| 2,399,135 | 4/1946 | Miller et al. | 328/30 |
| 2,408,078 | 9/1945 | Labin et al. | 328/30 |
| 2,792,497 | 5/1957 | Brooks | 328/30 X |
| 3,217,260 | 11/1965 | Wu | 328/30 X |
| 3,309,601 | 3/1967 | Dudley | 331/113.1 X |
| 3,395,338 | 7/1968 | Barringer | 324/6 |
| 3,418,572 | 12/1968 | Humphreys | 324/3 X |
| 3,535,557 | 10/1970 | Rodgers et al. | 330/15 X |
| 3,538,430 | 11/1970 | Bulgakov et al. | 324/6 |
| 3,609,522 | 9/1971 | Hutchins et al. | 324/6 |
| 3,617,865 | 11/1971 | Hakata | 324/67 X |
| 3,742,341 | 6/1973 | Clowes et al. | 324/67 X |
| 3,781,689 | 12/1973 | Marshall et al. | 307/268 X |
| 3,792,577 | 2/1974 | Fujita | 331/158 UX |
| 3,794,907 | 2/1974 | Fucito | 331/75 X |

Primary Examiner—Gerard R. Strecker

[57] ABSTRACT

My invention relates to improved method and means for a portable concealed structure locating and surveying exciter apparatus, and more particularly, to a portable device which couples by indirect connection alternating current energy into a structure which is usually obscured in a covert medium. A high stability source of first oscillations is provided which is undisturbed by perturbations in the degree of coupling between the concealed structure and the exciter, together with an adjustment, which is operable by a user of average skill, for maximizing the induction field when the apparatus is in the immediate presence of a large conductive structure which can otherwise affect the resonant efficiency of the inducer, thereby permitting the most effective use of an associated electromagnetic field detector apparatus of high selectivity. A mechanical resonant device of less costly form operating at a periodic rate not necessarily the same as, but rather at some lower or higher multiple of the exciter principal operating frequency is shown. A pulse shaper is provided which serves to condition the driving signal, as applied to the resonant inducer, for a condition of maximum power output and a minimum battery current.

19 Claims, 9 Drawing Figures

CONCEALED STRUCTURE LOCATING AND SURVEYING EXCITER

SUMMARY OF MY INVENTION

My instant application is a divisional application of my copending application Ser. No. 643,606 filed Dec. 22, 1975, now Pat. No. 4,044,299 entitled "Concealed Structure Locating and Surveying Translator Apparatus". My present invention relates to the hookup of electrical and mechanical devices for use in portable concealed object locating and surveying exciter apparatus and more particularly, to an alternating current electromagnetic field generator providing an exciting field of high stability.

In the field of locating and surveying concealed structures of great expanse in an underground, underwater, or other obscured environment one technique relies upon the sympathetic excitation of the obscured structure by an electromagnetic field generator or exciter. Known art relies upon the use of simple tuned oscillator circuits wherein the coupling loop means is made resonant and becomes the tuned element for the oscillator, or if other oscillator tuning means is provided as in the tuned grid (tuned base) class of circuit, the loading changes in the generator coupling loop field will still disturb or pull the frequency of the said generator. This frequency variation promotes the design of field detectors with wide bandwidth to accommodate the associated generators under any conditions of loading which might be normally encountered. The use of a detector of high performance is thereby negated considering the widening and compromising of the tuned circuit bandwidth which is made, the result of which is a higher amplified noise level and thus less operating range.

My invention improves upon prior art in that the inductive exciter relies upon the use of a mechanical resonant device to establish an alternating current frequency of excellent constancy, such said frequency being generated in an oscillating circuit which is itself isolated from the power delivering circuits so as to prevent a reflection in coupling of the inductive exciter to the external environment from causing nonuniformities in the frequency period.

My invention offers novelty upon prior art in that in the generation of the said constant alternating current frequency from a mechanical resonant device, the natural period or frequency of the device may be some higher order multiple of the operating frequency. The higher resonant device frequency is divided down by digital switching circuitry to the desired lower frequency. This offers a strong cost advantage in that the higher frequency resonant device can oftime be less expensive to manufacture.

My invention improves upon prior art in that the circuits which drive the induction loop in the exciter are operating in a most efficient manner by supplying only that power necessary to keep the loop supplied with the power needed to overcome its losses related to internal losses and external load coupling.

My invention improves upon prior art in that the exciter has provision to adjust the level and consumption of power to that just satisfactory to accomplish the necessary surveying, thus reducing the possibility of interference to other users of this or similiar equipment; and extending the life of the power source, such as batteries.

It is therefore a purpose of my invention to provide an alternating current field with exceptional freedom from the kinds of instabilities of periodicity caused by variations in field coupling, proximity effects be they magnetic or capacitive, and power supply conditions.

Additionally it is a purpose of my invention to be contained in a portable means which can be expected to safeguard the electrical circuits from physical damage when used in hazardous environs.

REFERENCE TO DRAWINGS

My disclosure includes three sheets of drawings containing five figures as:

FIG. 5 — FIGS. 5A and 5B show representation of the form my exciter means takes to be a practical, operative unit, including precautionary means.

FIG. 6 — 6A, 6B, and 6C show plots of the effect of the pulse shaper differentiation capacitance on pulse width, as well as the effect of pulse width on relative power output and battery power input.

Figure 1:
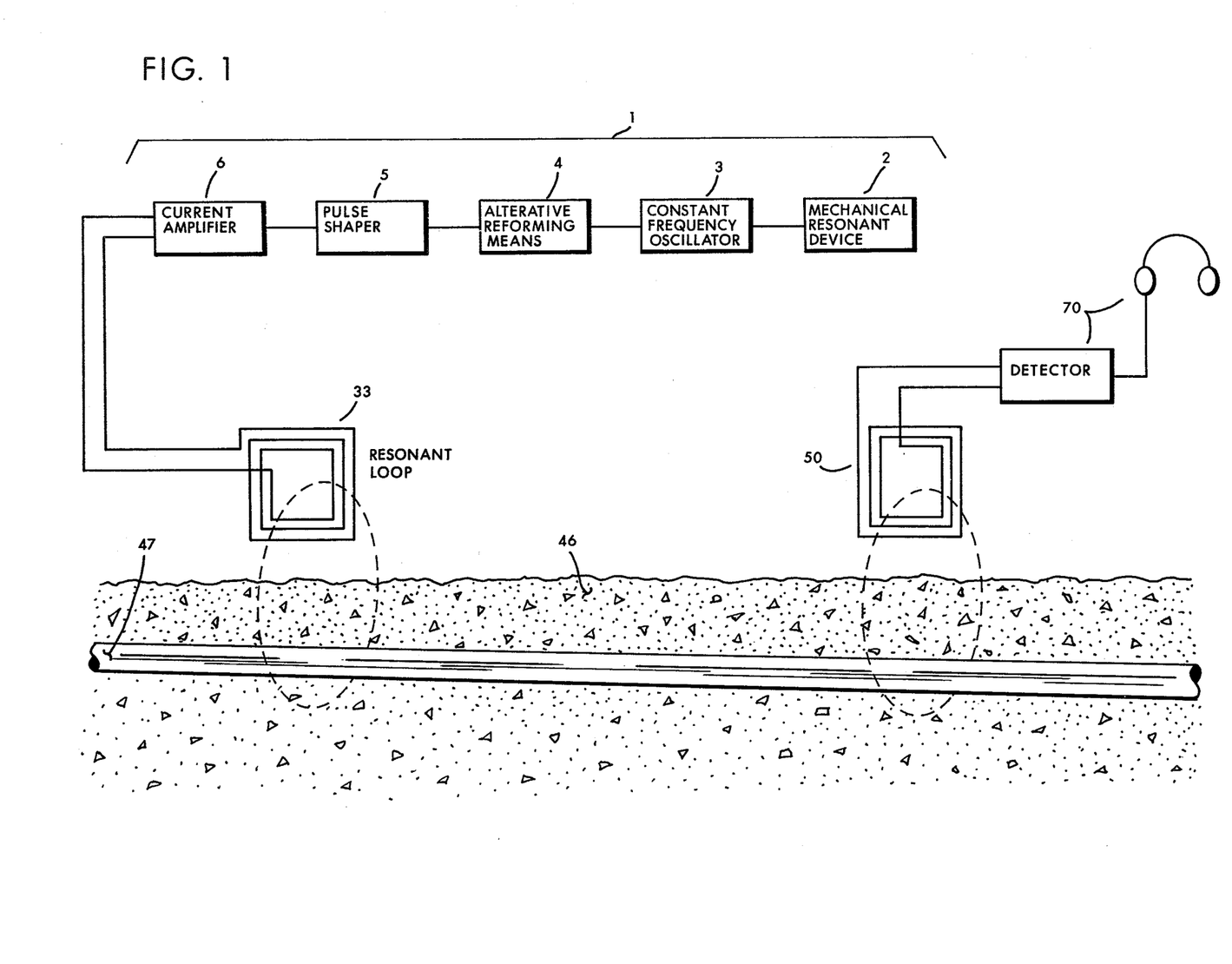
FIG. 1 — Functional Block Diagram for my exciter apparatus including illustration of how the said exciter may be used to cause indication in a cooperative detector means.

FIG. 1 illustrates the overall methodology employed by my CONCEALED STRUCTURE LOCATING AND SURVEYING EXCITER APPARATUS. In the preferred embodiment an inductive exciter 1 provides a frequency stable and constant level high frequency alternating current signal to an induction loop 33. The exciter 1 consists of a mechanical resonant device 2 which serves to stabilize the constant frequency oscillator 3. The said oscillator 3 serves to drive an alterative reforming means 4, the purpose for which is to improve the oscillator waveform, and in the case where the oscillator is operating at a higher first frequency than the final operating frequency of the exciter, the said reforming means 4 further provides for the division of the first frequency to that of a lower second frequency equal to that of the final operating frequency of the said exciter means. The altered output from the said reforming means 4 serves to drive the pulse shaper 5. The function of the pulse shaper is to optimize the waveform driving the input of the current amplifier 6. The said shaped waveform is caused to effect the best drive efficiency for the said current amplifier 6, the purpose for the said amplifier being to drive the resonant induction loop 33. The loop is suitably supported over or about the concealment medium 46 which for purpose of clarity is shown as earth, water, or some other moderately insulative substance. Within the soil or substance is located the concealment subject 47 again for purpose of illustration shown as a pipe, cable, or other extended structure. By means of the inductive field established by loop 33, some alternating current energy is sympathetically coupled through medium 46 into the more conductive structure 47. This coupled energy is again reradiated along the length and breadth of the structure at a replica rate of the originating inductive signal from the loop 33. The amplitude will be diminished depending upon the distance of suspension within the medium 46, and upon the ratio of relative conductivity of medium 46 as compared to conductive structure 47, where-in structure 47 is always somewhat a better conductor than medium 46. The reradiated field lines emanating from structure 47 throughout its dimensions are subsequently coupled into by a second pickup loop 50 where-in minute currents flow causing the development of substantial signal voltage at the frequency which was developed initially by the exciter 1. The method of coupling high frequency alternating current energy from a source by inductive means into a secondary conductive path which is separated by some insulative medium and subsequently inductively coupling by means of a second loop some of the parasitic engergy circulating in the secondary conductive path and thus developing a replica voltage or current is herein described for illustrative purposes to show the medium by which the exciter loop 33 and the detector loop 50 are coupled. The output of the detector loop 50 is then amplified by detector assembly 70 and used to cause indication of the lay of the concealed structure. The means and method for such detection and indication is not subject matter for this particular application and is mentioned merely to show useful application for my new invention.

Figure 2:
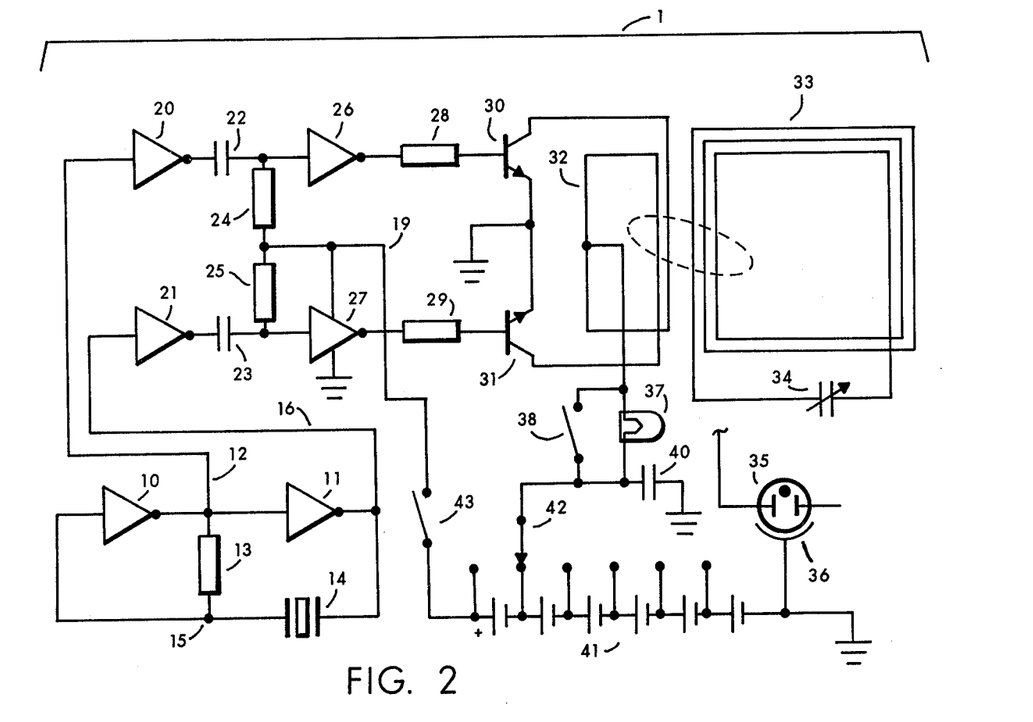
FIG. 2 — Schematic Diagram for an embodiment of my exciter means wherein the said first frequency is the same as the final operating frequency.

My INDUCTIVE EXCITER circuit is shown in FIG. 2 and is generally designated by the reference number 1. In my modeled embodiment the circuit consists of a single complimentary metal oxide semiconductor (C-MOS) integrated circuit chip comprised of six inverters 10, 11, 20, 21, 26 and 27, and power output transistors 30 and 31, together with other components about to be described.

A stabilized oscillating circuit consists of gain devices 10 and 11, a resistor 13, and a mechanical resonant device 14 which develops a stable principal source of first frequency alternating current energy. In my embodiment, gain devices 10 and 11 are two of the six aforementioned C-MOS inverters. Resonant device 14 is a piezoelectric device such as a quartz crystal. Operation begins when a source of D.C. power is applied to buss 19. Inherent circuit imbalance initiates the first transistion in the circuit. If this imbalance is of such a nature that output 16 from inverter 11 is driven low, the result is that a negative going level will be coupled through resonant device 14 and into the input of inverter 10 via line 15. The result is that the juncture 12 connected to the input of inverter 11 will be driven in a positive going direction due to the inversion through 10. Again the level will be inverted through 11 and line 16 as connected to 14 will be held low. This condition will continue for a period approximately equivalent to the time period of one-half cycle of the natural resonant frequency of device 14. At this moment, due to the resonant flywheel effect, stored energy effect, or "Q" of device 14, the voltage at 15 will begin to reverse and go positive even though 16 is still low. Line 15 rises to a value sufficient to cause 10 to transistion from a positive level at 12 to a more negative level thus causing juncture 16, the output of device 11, to likewise transistion from a negative level to a more positive level. All the circuit conditions will have become reversed. The result is that the output of device 14 as appearing on 15 will be driven fully positive. Again this condition persists until the flywheel effect of device 14 causes 15 to reverse and go negative. When the potential on 15 at the input of device 10 reaches a predetermined value, the circuit condition again reverses. This sequence repeats cyclically and since the time constant of the circuit is determined by resonant device 14, the output frequency at the output junctures 12 and 16 will be the natural resonant frequency of device 14. The level of the voltage at juncture 12 and 16 will be an alternating value between a more positive level and a less positive level. The instantaneous value on juncture 16 will be opposite that of the value on juncture 12. Resistor 13 serves to bias device 10 into its linear operating region, subject to the voltage values introduced from coupling through device 14 via line 15.

Gain devices 20 and 21 which consist of two inverters of the aforementioned C-MOS device are coupled to junctures 12 and 16 respectively. The purpose of the alterative reforming means consisting of gain devices 20 and 21 is principally two-fold. The gain of the devices sharpens the output rise and fall times of the signal arriving at their respective inputs from the oscillator. The result is a cleaner, more uniform output signal from devices 20 and 21 better suited for effectively driving the subsequent differentiator means. In addition the output of devices 20 and 21 may be loaded without disturbing the conditions for stable oscillation in devices 10 and 11. Thus the oscillator stability is markedly enhanced. The output from the alterative reforming means is a second frequency of improved form derived from, and in this particular case the same rate as the said first frequency. The output of device 20 drives a differentiator consisting of capacitor 22 and resistor 24. The time constant of the capacitors 22 and 23 in conjunction with their respective resistors 24 and 25 is chosen such that it is somewhat shorter than the half-cycle period of the alternating voltage appearing at the output of either device 20 or 21. As an expediency for purpose of manufacture, the absolute value of resistors 24 or 25 is determined by a test device known in the art as a "resistor substitution box", albeit the absolute values of capacitors 22 or 23 might just as effectively be determined through the use of a known "capacitor substitution box", or for that matter, a combination thereof may be employed. The result is that the input voltage to the fifth and sixth C-MOS inverters 26 and 27 is a predominately positive level with short negative going transistions, the period of which are determined by the aforementioned time constant associated with capacitors 22 and 23 together with resistors 24 and 25. The result is a train of output pulses from 26 and 27 which are predominately near zero in value with short positive going transistions. The period of the positive transistion or pulse signal is considerably less than the normal 180 electrical degrees "on", 180 electrical degrees "off" that is typified at the outputs of the prior inverters 20 and 21, the actual "on" period being found to be that which is necessary to provide sufficient power to the subsequent stages to replenish the losses sustained in the "Q" resonant winding 33 energy storage ability, yet prevent the here in after described current amplifier transistors 30, 31 from shunting, or loading, the stored energy contained in the said resonant winding. This teaching which is a most important part of the novelty of my herein described invention is, of course, dependent upon the well-known ability of any resonant circuit with a "Q", or "quality factor", in excess of unity to receive, store, and deliver energy. The output pulse from device 26 is delayed in time from that from gain device 27 by a period equivalent to one-half cycle time of the operating frequency. The positive pulses from device 26 are coupled into NPN transistor 30 through current limit resistor 28. In like manner the output of inverter 27 is coupled to transistor 31 through resistor 29. Transistors 30 and 31 operate as current switches or power amplifiers. The operation is akin to "Class D" wherein the transistors are biased off by their inherent base-emitter drop. They are then turned on in narrow pulses for only a portion of the operating cycle by the positive pulses arriving at their respective bases. Since the exciting drive pulses are alternatingly delayed by one-half cycle, the effect is push-pull operation of devices 30 and 31. The collector load for transistors 30 and 31 is a coupling loop 32 which is loosely coupled by mutual induction through a few turns adjacent to high "Q" resonant winding or loop 33. The coupling between 32 and 33 is adjusted to the degree necessary to establish the correct load impedance for transistors 30 and 31 as determined by their average D.C. collector current. Resonant loop 33 is tuned to the principal operating frequency by operator adjustable variable reactive tuning adjustment, viz capacitance 34, the purpose for which is not only to initialize the resonance of the inducer loop at the principal operating frequency, but also to provide for resonance readjustment should the reactive components, in particular the inducer loop inductance, be influenced by external coupling structures such as large masses of metal, and like factors. The physical configuration of the resonant winding 33 is of a goodly size so as to cause an electromagnetic field of large area. In my model the resonant loop is a spiderweb wound loop forming an approximate rectangle eight inches high by ten inches wide. Operator adjustable capacitive retuning means 34 is provided to give ready readjustment of the operating efficiency of the inducer when such efficiency is diminished through placement of the inducer adjacent to external coupling mediums of various conductivities, a phenomenon which can be expected to be characteristic of a large field inducer loop of high operating "Q". A gaseous discharge lamp, typified by a neon glow lamp 35 is coupled by one lead to one side of capacitor 34. The other lead from 35 is optionally not used. A ground plane is provided in the proximity of lamp 35, shown as 36 and taking the form of among others, that of a turn or two of bare wire looped around 35. The resulting A.C. field coupled capacitively will cause lamp 35 to glow. The purpose of indicator 35 is two-fold. First it confirms operation. Second it is a tuning aid in case of maladjustment of capacitance 34. The proper adjustment of resonance in loop 33 and capacitor 34 will cause the intensity of glow lamp 35 to increase to a peak. A second method to aid in returning is shown by illumination device 37 and switch 38. As is shown lamp 37 is an incandescent device through which the combined collector currents of transistors 30 and 31 flows when switch 38 is opened. The variations are that lamp 37 could be a light emitting diode (L.E.D.) semiconductor, a galvanometer, or other suitable sensory current indicating device. Switch 38 is not necessary for operation, but is preferable from the standpoint that when it is closed it shunts the indicating device and hence improves the overall efficiency by eliminating the voltage drop associated with the indicator. When lamp 37 is used for tuneup, the resonance of circuit elements 33 and 34 which coincides with the correct adjustment for resonance thereof will be apparent by either a minimum brightness indication of a lamp, or by a minimum current indication on a galvanometer or other such device. Switch 38 is preferable as a normally closed momentary action function to reduce the chance of its being left in the open position by the operator after tuneup is accomplished.

The D.C. power source for the operation of the circuit consists of a multicell battery 41, such as a dry-cell or rechargeable type. With a multicell battery, as for example six "flashlight" batteries, taps may be brought out between cells or groups of cells. This permits tap selector 42 to present a range of voltages to the amplifying transistors 30 and 31 to effect a reduction in power from that which would be available when only the full battery voltage is available. The capability for reducing power output further complies with the general intent of various Federal Communications Commission regulations regarding the necessity to produce the minimum radiations necessary to carry out the communications which is desired, when such radiation is at frequencies and powers which are under the regulation of the F.C.C. Power is applied to the oscillating and driving circuits through a disconnect means 43. When D.C. power is disconnected from the driver stages no current can flow through gain devices 30 and 31 because they are not forward biased into their conductive region. Therefore no means for disconnecting the power feeding to devices 30 and 31 collectors is needed.

Figure 3:
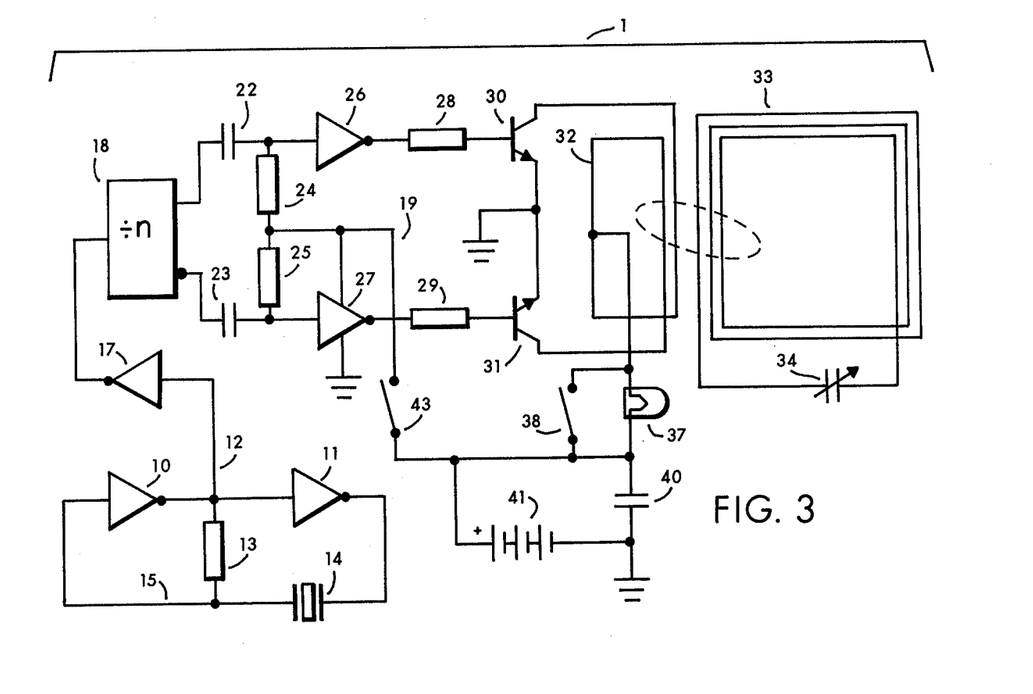
FIG. 3 — Schematic Diagram for an embodiment of my exciter means wherein the said first frequency is at some higher order multiple of the final operating frequency.

A modified version of my INDUCTIVE EXCITER is shown in FIG. 3. This embodiment enables the use of a resonant device 14 which is some higher multiple of the alternating current frequency resonance of induction loop 33 and resonant capacitance 34. My purpose is to enable the employment of higher first frequency and generally less costly resonant device 14. For example for the generation of 440 kilohertz frequency, a crystal of the quartz type resonant at 7.04 megahertz, which is commonly less costly, can be used if a means is provided to reduce the natural frequency of the oscillations set up by the higher-frequency crystal down to the lower principal frequency required for proper exciter operation. In the example given I divide the 7.04 megahertz frequency by sixteen, resulting in a desired frequency of 440 kilohertz:

$$7.04 \text{ MHz}/16 = 0.44 \text{ MHz} = 440 \text{ KHz}$$

In a more general and universal sense this might be expressed:

$$F_1/n = F_2$$

Where:
 $F_1$ = Frequency of resonant device in hertz;
 $F_2$ = Principal frequency of exciter in hertz;
 $n$ = division factor, an integer.

I specify the frequencies cited merely as examples by which to illustrate the point and anyone skilled in the art can obtain any number of combinations and recombination. The point is that I propose to use a higher first frequency $F_1$ source of alternating current, to subsequently divide that frequency by some natural number which here-in will be referred to as "$n$" and thus to derive a lower principal second frequency $F_2$ for purpose of efficient operation of the inductive exciter.

To continue with FIG. 3, I employ an oscillating circuit consisting of gain devices 10 and 11, a resistor 13, and a resonant device 14 the functioning of which was described earlier. The ouput of the oscillating circuit is connected from juncture 12 to an alterative frequency reforming means through an optional buffering device 17. The output of the buffering device 17 connects to the clock pulse or actuating signal input of a class of circuit 18 commonly called a counter, frequency divider, or flip-flops in a sequential circuit that has the ability to proceed cyclically through a set of stable states in response to a series of clock pulses at the input. The particular circuit combination of frequency reforming or counting device 18 will enable division by any natural number greater than one through operative interconnections of the counting elements. The output of the division stage 18 is two levels which complement, or are inverted replicas of each other. The two outputs each feed a differentiating network consisting of capacitor 22 and resistor 24 in one line, and capacitor 23 and resistor 25 in the complement line. The time constants are selected as described earlier. Inverters or gain devices 26 and 27 condition, amplify and shape the respective differentiator outputs which in turn serve to drive transistors 30 and 31 through current limiting resistance 28 and 29. The collector load for the exciting drive pulses delivered through power gain devices 30 and 31 is a coupling loop 32 which is loosely coupled by mutual induction through a proximity association with resonant loop 33. As previously cited the coupling between 32 and 33 is adjusted to the degree necessary to establish the correct load impedance or power transfer for transistors 30 and 31 as determined by their average D.C. collector current. Resonant loop 33 and the associated resonating capacitance 34 are chosen such that they are self resonant at the principal frequency $F_2$ which is equal to the natural frequency of the frequency determining element $F_1$ device 14 divided by the "$n$" amount in said counter 18. The modified exciter may be combined with any of the tuning aids and indicating devices described elsewhere in this specification which may be applicable.

Figure 4:
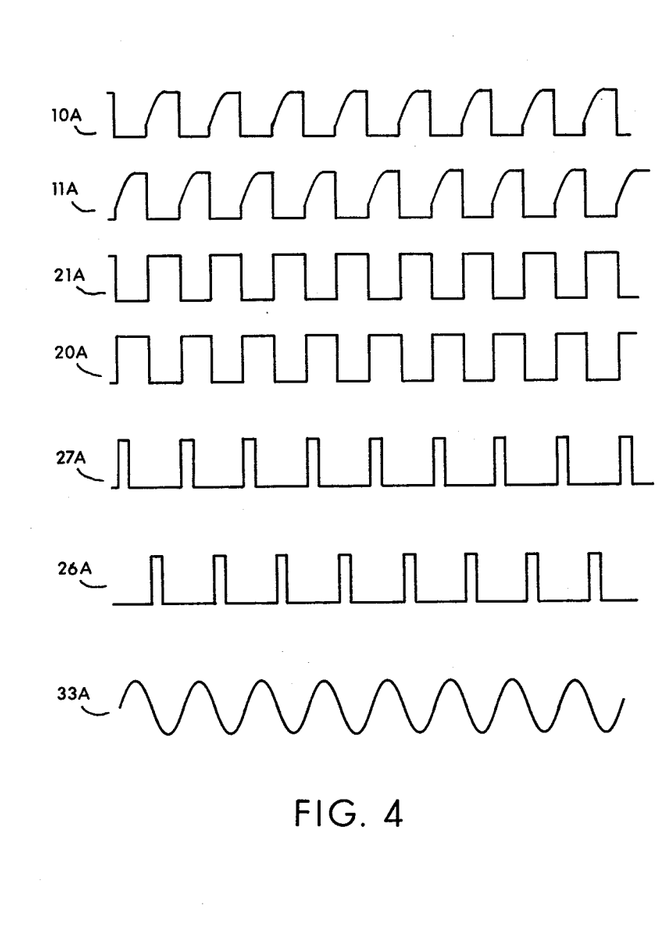
FIG. 4 — Waveforms showing the typical operating conditions for various points in my exciter means embodiment shown in FIG. 2.

FIG. 4 shows the waveforms which are produced in my particular exciter form shown in FIG. 2. In FIG. 4, the waveforms 10A and 11A reflect the general form of the outputs from the oscillator gain devices 10 and 11 in FIG. 2. What is shown by the said waveforms 10A and 11A, albeit somewhat exaggerated for purpose of illustration, is the retarded nature of the oscillator waveform risetime. The waveforms 20A and 21A shown in FIG. 4 reflect the resultant outputs from the respective alterative reforming means gain devices 20 and 21 in FIG. 2. What is shown by the said waveforms 20A and 21A is the altered, improved waveform risetime as necessary to drive the subsequent pulse shaper 5, shown in FIG. 1. Continuing with FIG. 4, waveforms 26A and 27A reflect the reshaped output from the pulse shaper gain devices 26 and 27 in FIG. 2. What is shown by the said waveforms 26A and 27A is the reshaped, considerably narrowed driving pulses delivered to the output current amplifiers 30 and 31 in FIG. 2 for the purpose of exciting, but not overdriving, resonant loop 33.

The sinusoidal waveform 33A in FIG. 4 is representative of the electromagnetic field waveform which may be expected to emanate from the inducer 33 in FIG. 2 when adjusted according to the manner of my new invention. This sinusoidal waveform may be observed by a person skilled in the art by means of an auxiliary untuned pickup loop connected to the input of a suitable oscilloscope, with the said auxiliary loop arranged to very loosely intercept the field lines radiating from the said inducer loop 33.

Figure 5:
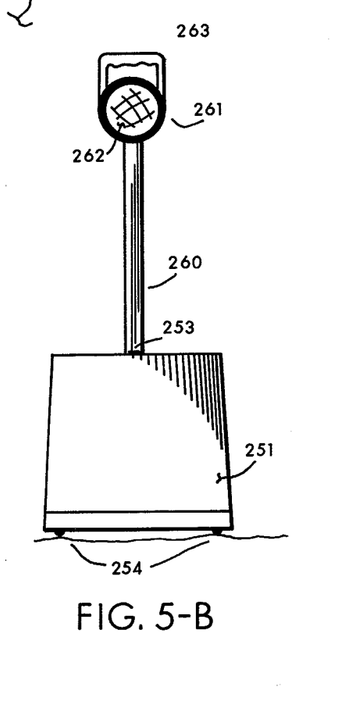

Proper and correct operation is secured when the drive pulses 26A and 27A in FIG. 4 are reduced in width or "on-time" duration until the amplitude of the said sinusoidal waveform 33A reaches a maximum whereupon the pulse width is, in a small degree the particular amount of which is determined by the inducer 33 characteristics, reincreased in pulse width until the said issuing field, represented by waveform 33A, just starts to deteriorate in amplitude by not more than a few percent, a condition the magnitude of which is principally contingent upon the quality or operation "Q" factor of the inducer means 33. I was further suprised to observe that not only will decreasing the said "on-time" duration cause deterioration of the inducer output waveform amplitude, but almost equally important is the decrease of the output waveform amplitude when the "on-time" duration is increased so as to be too long. Furthermore, when the "on-time" is too long the battery current will significantly increase. Thus I dramatically showed the importance of providing pulse width shaping, according to my new teachings, which is neither too long nor too short as a means for obtaining maximum induction field output commensurate with minimum primary power consumption. In practice I have found that once this waveform is defined, it is consistant from unit to unit so long as the inducer means 33 form is in no way changed, negating any significant advantage for providing an operator adjustable pulse shaper means 5 in lieu of a fixed, preset pulse shaper as I show in my embodiments. FIG. 5A and FIG. 5B show my form of inductive exciter makeup according to my invention. The assemblage 250 consists of an enclosure 251 which houses the electrical detail 1 for the exciter including induction loop 33. An access means such as a cover 252 is provided to change batteries, make adjustments, and for service. A closure means 253 keeps the cover in place. Extension feet or supports 254 enable placing the equipment on unsmooth surfaces. Control 255 permits the operator to turn the exciter on and off with switch 43. A supporting means 260 extends from the top of the enclosure 251 and carries at its extreme end a housing 261 which contains a wide-angle reflective or illuminated cautioning means 262 in conjunction with carrying handle 263. I have found it advantageous to incorporate the cautioning means 262 into the exciter assemblage 250 since it has been observed that in many applications for my invention the warning of its presence to foot or machine traffic will be necessary. Supporting means 260 can be manufactured so as to be separable from enclosure 251 for stowage or where the additional height of the extension 260 would interfere with the effective placement of enclosure 251.

Figure 6:
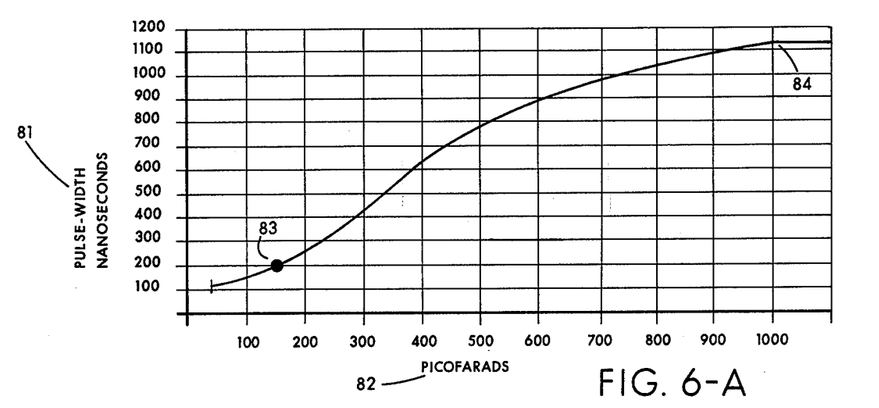

The values shown in FIGS. 6A, 6B, and 6C may, of course, be expected to depend upon frequency, inducer configuration, inducer "Q", and other parameters. The represented values do, in fact, give illustration of the values an artisian might reasonably expect when duplicating the modeled form of my invention. I have tried similar measurements with changed parameters, with the spirit of this improvement being shown to present itself in each form $1/2F_c$, when $F_c = 442$ kilohertz.

FIG. 6B further shows how, with various pulse widths 86, the relative power output 85 is strongly influenced by said driving pulse width. The relative power output is shown to be normalized at point 87 for a pulse width of 200 nanoseconds for a principal frequency of 442 kilohertz. This plot clearly shows how a particular pulse width, as determined by my herein described pulse shaper means, does effect a strong influence on realized power output. The plot further shows that non-pulse shaped operation is not preferable, as under this condition the relative power output is only about 43% of what might be expected with a properly shaped pulse.

FIG. 6C illustrates the effect of drive pulse width 88 on power input 87, which means, in my modeled example, the power drawn from the battery 41. At the operating point 89 shown for the preferred values described for FIGS. 6A and 6B, the power input is shown to be measured, in my particular model form, to be only about 770 milliwatts. On the other hand the measured input, without the pulse shaping means is about 2.4 watts, or nearly 3.12 times as great. Combined with the efficiency of power output shown for FIG. 6B (43%) this means a 7.26 times improvement in power consumption savings, resulting in a greatly improved effective battery life. Said another way, this shows that under the modeled conditions, an exciter not employing the new art of my teachings can be expected to be only 14% as effective as what my new apparatus is, for a given power consumption.

FIG. 6A shows a plot of the effect of the value 82 of the pulse shaper capacitors 22, 23 on the pulse width 81 resulting at the outputs of said inverters 26, 27 respectively. The operating point 83 is that chosen for my particular described model. The break at point 84 represents the point where the pulse width 81 equals 1.1312 microseconds, or:

The elements comprising the inductive exciter circuit 1 when properly coupled to each other form a compact package which can be principally contained upon a printed circuit board or similiar support means within the exciter housing 251. My model which operates successfully utilizes the following key components and component values:

| | |
|---|---|
| integrated circuit 10, 11, (17), 20, 21, 26 and/or 27 | CD4049AE (1/6 each) |
| resistor 13 | 47,000 ohms 1/4 watt |
| quartz crystal 14 (FIG. 2) | 440 kilohertz |
| quartz crystal 14 (FIG. 3) | 7.04 megahertz |
| integrated circuit 18 | two CD4027AE connected operative as divide by 16 counter. |
| capacitors 22, 23 | 820 picofarad |
| resistors 24, 25 | 1,200 ohms |
| resistors 28, 29 | 3,300 ohms |
| transistors 30, 31 | 2N2222 |
| capacitors 34 | 150 picofarad |
| indicator 35 | NE-2 |
| indicator 37 | Mazda #49 |
| capacitor 40 | 200 nanofarad |
| battery 41 | 9 volt D.C. |

The foregoing parameters and values are given by way of example only to assist one of average skill in the art to duplicate my invention and are not intended to limit in any way the scope of my invention.

I have hitherto described my invention in terms of a particular form because that form presents most clearly the difficulties my invention improves upon, but it will be understood that my invention is also applicable to other manner of construction.

While my invention has been shown to use particular types of integrated circuit gain and function devices, a person skilled in the art could duplicate the same functions from built up circuits consisting of individual components arranged in a wide variety of combinations. While my invention is shown to use a method of frequency division from a high frequency resonant device 14 to obtain a lower operating frequency this should not discount the possibility of using a lower frequency resonant device or circuit and multiplying this lower frequency to a higher principal operating frequency.

While my exciter is shown as a portable, hand carried unit this does not construe it to be limited to this configuration alone, but might include a submersible form, or one that is affixed or part of another machine, or that is itself propelled, or that is transported in some other manner.

What I claim is:

1. An inductive exciter means which has the capacity to stimulate sympathetic electromagnetic vibrations of a constant frequency in a concealed structure for the purpose of locating and surveying the said concealed structure including in combination:
    (a) stabilized oscillator means operative to produce a source of first alternating current frequency,
    (b) alterative reforming means coupled to the output of said oscillator means wherein said reforming means is operative to produce a source of squared waveform second alternating current frequency signal the periodicity of which is derived from the said first alternating current frequency, wherein said reforming means includes an output means therefrom for providing said signal,
    (c) current amplifier means, including an input means for accepting voltage pulses, said current amplifier means being operative to increase the elctrical amplitude of the said voltage pulses at the output of the said amplifier,
    (d) resonant winding means of goodly size and high operating "Q" loosely inductively coupled to the said current amplifier means output and operative so as to cause an electromagnetic field of large proportions and area, such field being caused to be sympathetically coupled into the concealed structure through suitable orientation of the said resonant winding so as to inductively excite the said structure to again reradiate electromagnetic field lines along the length and breadth of the said structure at a replica rate of the originating inductive signal frequency,
    (e) a source of direct current power connected so as to be operative to provide the electrical operating potentials as required for the proper functioning of the said stabilized oscillator means, said alterative reforming means, and said current amplifier means, and pulse shaper means, consisting of at least one input and at least one output, wherein said pulse shaper is comprised of at least one resistor and at least one capacitor arranged in the general form of a differentiator with the input thereto operatively coupled to the said source of squared waveform second alternating frequency signal provided by the said reforming means output, and with the output thereto coupled to the said current amplifier means input, the time constant of said differentiator resistor and capacitor being somewhat shorter than the half-cycle period of the output signal from the reforming means, wherein said pulse shaper means produces output voltage pulses, in response to said inputed squared waveform second alternating frequency signal which are improved in waveform efficaciousness by reducing the width, or "on time", of the exciting drive pulse delivered through the said current amplifier means to the said resonant winding means until the amplitude of the induction field emanating from said winding means reaches a maximum, whereupon the said pulse width is, in a small degree, re-increased until the said issuing field just starts to decline in amplitude by not more than a few percent, such condition being found to be that which is necessary to provide sufficient power from the said current amplifier to overcome the losses sustained in the energy storage ability of the high "Q" resonant winding, yet prevent the said current amplifier from shunting, or loading, and thereby dissipating any significant portion of the stored energy contained in the said resonant winding.

2. The exciter of claim 1 wherein said oscillator means includes a mechanical resonant device, said resonant device being a piezoelectric quartz crystal.

3. The exciter of claim 1 wherein said oscillator means is operative to produce a source of first alternating current frequency, the said first A.C. frequency being some multiple "$n$" higher than the principal operating frequency of the apparatus.

4. The exciter of claim 3 wherein said source of first A.C. frequency is coupled to a reforming means the embodiment of which includes divider means as a sequential counting circuit operative to provide a source of second A.C. frequency which is the quotient of said first A.C. frequency lowered by the divisor "$n$" of the said divider means, said second A.C. frequency thus resulting being the principal operating frequency of the apparatus.

5. The exciter of claim 1 wherein said oscillator means is operative to produce a source of first alternating current frequency, and furthermore that the said first A.C. frequency so produced be at the principal operating frequency of the apparatus.

6. The exciter of claim 5 wherein said source of first A.C. frequency is coupled to a reforming means the embodiment of which includes means for waveshape enhancement and load isolation and is operative to produce a source of second A.C. frequency the periodicity of which is the same as the first A.C. frequency.

7. The exciter of claim 1 wherein said oscillator means is operative to produce a source of first alternating current frequency, the said first A.C. frequency being some sub-multiple lower than the principal operating frequency of the exciter apparatus.

8. The exciter of claim 7 wherein said source of first A.C. frequency is coupled to a reforming means the embodiment of which includes multiplier means as a harmonic generator to provide a source of second A.C. frequency increased by the said multiplier means, said second A.C. frequency thus resulting being at the principal operating frequency of the exciter apparatus.

9. The exciter of claim 1 wherein said pulse shaper means includes gain stages to isolate the said oscillator means from instabilities caused by load changes induced into the said resonant winding.

10. The exciter of claim 1 wherein said pulse shaper means includes a differentiator circuit to cause voltage pulses to be produced in response to said oscillator signals which are somewhat shorter than one half the period of the said oscillations, said period being found to be that necessary to provide sufficient power to replenish the losses sustained in the said resonant winding, the purpose for which is to reduce the direct current power consumption and thus improve the said exciter efficiency.

11. The exciter of claim 1 wherein said current amplifier means includes an aid in retuning which measures the collector current of the said amplifier means with a sensory indicator and furthermore is configured so as to allow ready and meaningful adjustment by an operator of average skill.

12. The exciter of claim 1 wherein said resonant winding includes an aid in returning which indicates the peaking of the resonance induced voltage by means of a gaseous glow lamp.

13. The exciter of claim 1 wherein said source of direct current power includes a multicell battery arrangement with a movable tap selector to effect a reduction in power from that which would be available when only full multicell battery voltage is available thus improving battery power conservation and reducing extraneous radiations when less than maximum power is adequate for the purpose.

14. The exciter of claim 13 wherein said battery is rechargable from an external source of prime power.

15. The exciter of claim 1 wherein said exciter is contained in a portable housing which includes a self-contained wide-angle visual cautioning means operative for the warning of said portable housing's presence to foot or machine traffic.

16. The exciter of claim 15 wherein said cautioning means is a retroreflective illumination device which includes means for optional self-illumination.

17. The exciter of claim 15 wherein said cautioning means is made to extend above the uppermost surface of the exciter housing and includes an optional handle means for transporting the said exciter assemblage.

18. The exciter of claim 17 wherein said extended cautioning means is made to be removable from its extended position to allow for confined placement of the said exciter assemblage.

19. The resonant winding means as in claim 1 wherein said winding turns are oriented so as to have the major plane of the winding nearly perpendicular to the concealed structure lay in the first plane axis, while the second plane axis is arranged so as to be juxtaposed about parallel with the major longitudinal axis of the said concealed structure lay.

* * * * *

UNITED STATES PATENT OFFICE
CERTIFICATE OF CORRECTION

Patent No. 4,095,167          Dated June 13, 1978

Inventor(s) Harold James Weber

It is certified that error appears in the above-identified patent and that said Letters Patent are hereby corrected as shown below:

Column 10, lines 49 and 50 should read as follows:

-- reforming means, and said current amplifier means, and (f) pulse shaper means, consisting of at least one --.

Signed and Sealed this

Nineteenth Day of June 1979

[SEAL]

Attest:

RUTH C. MASON
Attesting Officer

DONALD W. BANNER
Commissioner of Patents and Trademarks